United States Patent [19]

Oguchi

[11] Patent Number: 4,570,222
[45] Date of Patent: Feb. 11, 1986

[54] INFORMATION PROCESSOR HAVING INFORMATION CORRECTING FUNCTION

[75] Inventor: Tetsuji Oguchi, Tokyo, Japan

[73] Assignee: Nippon Electric Co., Ltd., Tokyo, Japan

[21] Appl. No.: 529,921

[22] Filed: Sep. 6, 1983

Related U.S. Application Data

[63] Continuation of Ser. No. 206,061, Nov. 12, 1980, abandoned.

[30] Foreign Application Priority Data

Nov. 15, 1979 [JP] Japan ............................... 54-148031

[51] Int. Cl.⁴ ............................................. G06F 13/00
[52] U.S. Cl. ................................................... 364/200
[58] Field of Search ............... 364/200, 900; 340/703, 340/717, 709, 723

[56] References Cited

U.S. PATENT DOCUMENTS

| 2,552,629 | 5/1951 | Hamming | 371/37 |
|---|---|---|---|
| 3,402,390 | 9/1968 | Tsimbidis | 371/37 |
| 4,016,544 | 4/1977 | Morita et al. | 340/703 |
| 4,149,184 | 4/1979 | Giddings et al. | 340/703 |
| 4,203,102 | 5/1980 | Hydes | 340/723 |
| 4,290,063 | 9/1981 | Traster | 340/723 |
| 4,296,494 | 10/1981 | Ishikawa et al. | 371/13 |

OTHER PUBLICATIONS

Bell System Technical Journal, R. W. Hamming, Apr. 1950, pp. 147-160.

Primary Examiner—Thomas M. Heckler
Attorney, Agent, or Firm—Laff, Whitesel, Conte & Saret

[57] ABSTRACT

The invention selectively designates a specific portion of information which is stored in a memory to identify information which is to be corrected. It further enables a correction of only the suitably designated portion. The read out of information having the corrected information is set in a state which is ready for use. Accordingly, it is not necessary to use a bit addressing circuit, as used in the prior art, this simplifying both the circuit design and the wiring. It is also possible to designate more than one arbitrary item of information as portions which are to be corrected and then to correct all designated information simultaneously. Thus, the read out information is corrected at a high speed. In addition, the number of information items which are capable of correction is not limited by unnecessary bit addressing. This enables an increase in the number of memory elements, and makes the system quite useful as a control device for CRT display systems.

8 Claims, 12 Drawing Figures

|    | 16 | 15 | 14 | 13 | 12 | 11 | 10 | 9 | 8 | 7 | 6 | 5 | 4 | 3 | 2 | 1 |
|----|----|----|----|----|----|----|----|---|---|---|---|---|---|---|---|---|
| (A)| 0  | 0  | 1  | 0  | 0  | 0  | 0  | 1 | 0 | 0 | 0 | 1 | 0 | 0 | 1 | 0 |

|    | 16 | 15 | 14 | 13 | 12 | 11 | 10 | 9 | 8 | 7 | 6 | 5 | 4 | 3 | 2 | 1 |
|----|----|----|----|----|----|----|----|---|---|---|---|---|---|---|---|---|
| (B)| 1  | 1  | 0  | 1  | 1  | 1  | 1  | 0 | 1 | 1 | 0 | 1 | 1 | 0 | 1 |   |

Note: (B) row shows: 1 1 0 1 1 1 1 0 1 1 0 1 1 0 1

|    |    |    |    |    |    | 11 |    |   |   |   |   |   |   |   |   |   |
|----|----|----|----|----|----|----|----|---|---|---|---|---|---|---|---|---|
| (C)|    |    |    |    |    | 1  |    |   |   |   |   |   |   |   |   |   |

|    | 16 | 15 | 14 | 13 | 12 | 11 | 10 | 9 | 8 | 7 | 6 | 5 | 4 | 3 | 2 | 1 |
|----|----|----|----|----|----|----|----|---|---|---|---|---|---|---|---|---|
| (D)| 0  | 0  | 1  | 0  | 0  | 1  | 0  | 1 | 0 | 0 | 0 | 1 | 0 | 0 | 1 | 0 |

|    | 4 | 3 | 2 | 1 |
|----|---|---|---|---|
| (E)| 1 | 0 | 1 | 0 |

FIG. 5

(PRIOR ART)

|    | 16 | 15 | 14 | 13 | 12 | 11 | 10 | 9 | 8 | 7 | 6 | 5 | 4 | 3 | 2 | 1 |
|----|----|----|----|----|----|----|----|---|---|---|---|---|---|---|---|---|
| (A)| 0  | 0  | 1  | 0  | 0  | 0  | 0  | 1 | 0 | 0 | 0 | 1 | 0 | 0 | 1 | 0 |
| (B)| 0  | 0  | 1  | 0  | 0  | 1  | 0  | 1 | 0 | 0 | 0 | 1 | 0 | 0 | 1 | 0 |
| (C)| 0  | 0  | 1  | 0  | 0  | 1  | 0  | 1 | 0 | 0 | 0 | 1 | 0 | 0 | 1 | 0 |
| (D)| 0  | 0  | 1  | 0  | 0  | 1  | 0  | 1 | 0 | 0 | 0 | 1 | 0 | 0 | 1 | 0 |
| (E)| 0  | 0  | 0  | 0  | 0  | 1  | 0  | 0 | 0 | 0 | 0 | 0 | 0 | 0 | 0 | 0 |

FIG. 6

|    | 16 | 15 | 14 | 13 | 12 | 11 | 10 | 9 | 8 | 7 | 6 | 5 | 4 | 3 | 2 | 1 |
|----|----|----|----|----|----|----|----|---|---|---|---|---|---|---|---|---|
| (A)| 0  | 0  | 1  | 0  | 0  | 0  | 0  | 1 | 0 | 0 | 0 | 1 | 0 | 0 | 1 | 0 |
| (B)| 1  | 1  | 0  | 1  | 1  | 1  | 1  | 0 | 1 | 1 | 1 | 0 | 1 | 1 | 0 | 1 |
| (C)| 1  | 1  | 0  | 1  | 1  | 1  | 1  | 0 | 1 | 1 | 1 | 0 | 1 | 1 | 0 | 1 |
| (D)| 1  | 1  | 1  | 1  | 1  | 1  | 1  | 1 | 1 | 1 | 1 | 1 | 1 | 1 | 1 | 1 |

*FIG. 7*

|    | 16 | 15 | 14 | 13 | 12 | 11 | 10 | 9 | 8 | 7 | 6 | 5 | 4 | 3 | 2 | 1 |
|----|----|----|----|----|----|----|----|---|---|---|---|---|---|---|---|---|
| (A)| 0  | 0  | 1  | 0  | 0  | 0  | 0  | 1 | 0 | 0 | 0 | 1 | 0 | 0 | 1 | 0 |
| (B)| 1  | 0  | 0  | 0  | 1  | 0  | 1  | 1 | 1 | 0 | 1 | 1 | 1 | 0 | 0 | 0 |
| (C)| 1  | 0  | 0  | 0  | 1  | 0  | 1  | 1 | 1 | 0 | 1 | 1 | 1 | 0 | 0 | 0 |
| (D)| 1  | 0  | 1  | 0  | 1  | 0  | 1  | 0 | 1 | 0 | 1 | 0 | 1 | 0 | 1 | 0 |

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| (A) | 0 | 0 | 1 | 0 | 0 | 0 | 0 | 1 | 0 | 0 | 0 | 1 | 0 | 0 | 1 | 0 |
| (B) | 0 | 0 | 1 | 0 | 0 | 1 | 0 | 1 | 0 | 0 | 0 | 1 | 0 | 0 | 1 | 0 |
| (C) | 0 | 0 | 1 | 0 | 0 | 1 | 0 | 1 | 0 | 0 | 0 | 1 | 0 | 0 | 1 | 0 |
| (D) | 0 | 0 | 0 | 0 | 0 | 1 | 0 | 0 | 0 | 0 | 0 | 0 | 0 | 0 | 0 | 0 |

FIG. 10

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| (A) | 0 | 0 | 1 | 0 | 0 | 0 | 0 | 1 | 0 | 0 | 0 | 1 | 0 | 0 | 1 | 0 |
| (B) | 0 | 0 | 0 | 0 | 0 | 0 | 0 | 1 | 0 | 0 | 0 | 1 | 0 | 0 | 1 | 0 |
| (C) | 0 | 0 | 0 | 0 | 0 | 0 | 0 | 1 | 0 | 0 | 0 | 1 | 0 | 0 | 1 | 0 |
| (D) | 0 | 0 | 1 | 0 | 0 | 0 | 0 | 0 | 0 | 0 | 0 | 0 | 0 | 0 | 0 | 0 |

FIG. 11

INFORMATION PROCESSOR HAVING INFORMATION CORRECTING FUNCTION

This is a continuation of Ser. No. 206,061, filed Nov. 12, 1980, abandoned.

BACKGROUND OF THE INVENTION

The present invention relates to an information processor, and more particularly to a processing system having a function to correct, revise or rectify information stored in a memory.

Information processors which carry out commands or instructions given by program operation or key manipulation are widely used in many fields, today. They have also come to be used in systems to display character or graphic patterns as large capacity, low cost memories were placed on market. For instance, the pattern data to be displayed on a raster-scan type cathode ray tube (hereinafter referred to as "CRT") are prepared by a data processor. In this case, the display pattern data are stored in the memory as a group of bit information. Here, one bit information corresponds to one picture element data of a CRT. The required bits of information are sequentially read out and transferred one by one to the display by addressing the memory. For this purpose, the data processor has addressing means which is capable of designating the required bit information. If the screen of a CRT is organized of, for example, 1024×1024 picture elements, the memory should have a capacity of 1024×1024 bits (about 1 mega bits).

On the other hand, the pattern is changed sequentially by changing the previous bit information stored in the memory, to be newly displayed on the screen. Thus, a data processor is required to have a function to change, bit by bit, the previous bit information according to the program.

The bit changing means in the prior art used a word addressing system which reads out simultaneously a plurality of bit data for one addressing. By first reading the word data (pattern data) of plural bits (i.e. of 8 bits, 16 bits, 32 bits, etc.) from the memory, the similar changing was performed in respect of all the bits of the word data thus read out. Thereafter, a specific memory cell corresponding to the bit location to be changed was designated by bit addressing means, and the bit data which had been changed was written therein one by one. At that writing time, the bit addressing means was used for selecting the specified memory cell. It then became possible to change the specific one bit of the word data.

However, this conventional means required the one memory cell selection for storing the changed bit data, which in turn required a complex circuit for bit addressing means. This bit addressing circuit, moreover, had to be connected separately for each of the memory elements in which the word data was written. This form of addressing necessarily complicated wiring between the bit addressing circuit and the memory elements. Further, such an addressing application was unsuitable for larger capacity memories, because of restrictions upon the number of memory elements capable of selection by the bit addressing means. Thus, it was impossible to install more memory elements.

The prior art information processor had an additional drawback that changed bit data were stored one by one in the specified memory location, at a different timing, thus prolonging the time required for storing the newly displayed pattern data in the memory. This redundancy of the changing time exerted undesirable effects on the CRT display.

SUMMARY OF THE INVENTION

An object of the present invention is to provide a novel information processor which enables bit change with a simple circuit design.

Another object of the present invention is to provide an information handling unit which is capable of changing more than one arbitrary number of bits of the word data with a simple operation and at a high speed.

Still another object of the present invention is to provide an information processor suitable as a control device for pattern display for which the number of memory locations may be increased easily.

Yet another object of the present invention is to provide an information processor which has various information changing functions of SET, RESET, INVERT and REPLACE, and which is capable of suitably selecting these functions responsive to commands or instructions.

The information processor of the present invention comprises a memory which stores information (such as data, instructions, commands, etc.) in the various memory locations. Addressing designates an address of the memory location in the memory and reads out the information from the memory. For directing the content to be changed, a designating means designates the portion to be changed from among the read out information. Then, a changing means selectively changed the information of the portion designated by the designating means, and a transfer means transfers the read out information including the information changed by the changing means.

According to the present invention, it is possible to designate selectively a specific portion with the information which is to be changed. It further enables suitably changing only the designated portion. The read out information having the changed information is set in a state ready for use. Accordingly, the bit addressing circuit used in the prior art becomes altogether unnecessary, thereby simplifying both the circuit design and the wiring. It is also possible to designate more than one arbitrary piece of information as a portion to be changed, and then to change all such portions simultaneously. Thus, the read out information is changed at a high speed. In addition, the number of information portions, which are capable of being changed is not limited by requiring an unnecessary bit addressing means, thereby enabling an increase in the number of memory elements, and by making the system quite useful as a control device for CRT display system.

BRIEF DESCRIPTION OF THE DRAWINGS

Other objects and advantages of the invention will be fully apprehended from the following detailed description of the preferred illustrative embodiments thereof taken in connection with the appended drawings in which.

Figure 1:
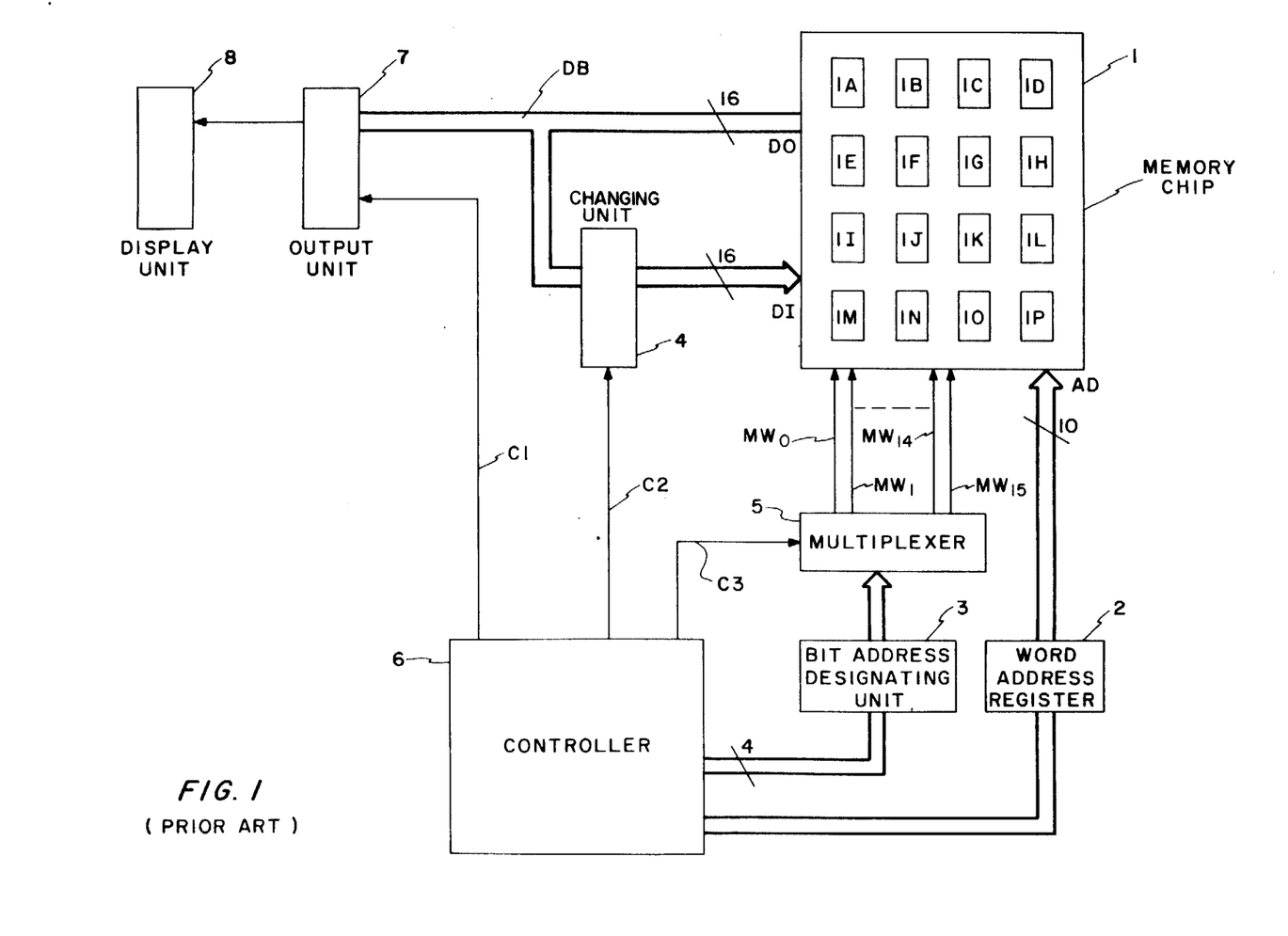
FIG. 1 is a block diagram showing a prior art information processor having information changing function.

The prior art information processor having a bit changing function is constructed as shown in FIG. 1. There is shown an example where 16-bit data is transmitted from and to the memory by a single addressing. If one memory element (1 chip) has a capacity of 16 k bits, then it includes 16 blocks $1a$–$1p$, each of a 1-k-bit capacity, respectively. The memory chip 1 further has groups of data input terminals (DI) and output terminals (DO), each group having sixteen terminals. In addition, it has ten address input terminals (AD) for controlling input and/or output information. An address data consisting of 10 bits are generated at a controller 6, and are transferred, in parallel, to the respective 10 address input terminals via a word address register 2. The 10-bit address data is supplied commonly to the respective blocks, and 1-bit data is read out from each of the blocks. Thus, the 16-bit output data is read out at once by one address to a data bus (16-bit line) DB via the data output terminals DO. This 16-bit data is serially sent bit by bit to a display unit 8 from an output unit 7, in response to the control signal C1 from the controller 6. When all the addresses in the memory 1 have been designated, the 16-k-bit data is transferred to the display unit, and the pattern is displayed at 16-k-dot picture elements.

A change of the pattern is carried out according to the procedure explained hereinbelow. As the hardware mechanism, there are required a changing unit 4 which performs the identical changes concurrently for all the read out bits, a bit address designating unit 3 and a multiplexer 5. Of the read out 16-bit data, one bit is a minimum credit required to be corrected. Accordingly, the bit address designating unit 3 designates one bit out of 16-bit data. In this case, the bit designating address data includes 4 bits and is generated at the controller 6. This 4-bit address data is decoded after it is stored in a register in the bit address designating unit 3, and the result thereof is fed to the multiplexer 5. The multiplexer 5 generates signals ($MW_0$–$MW_{15}$) to select a designated one from the 16 memory blocks (1A–1P). Another signal fed to the multiplexer 5 is the Data Writing signal $C_3$ for the memory 1. Then, one bit is selected from the data changed by the changing unit 4 to be written in the specified memory block.

Figure 5:
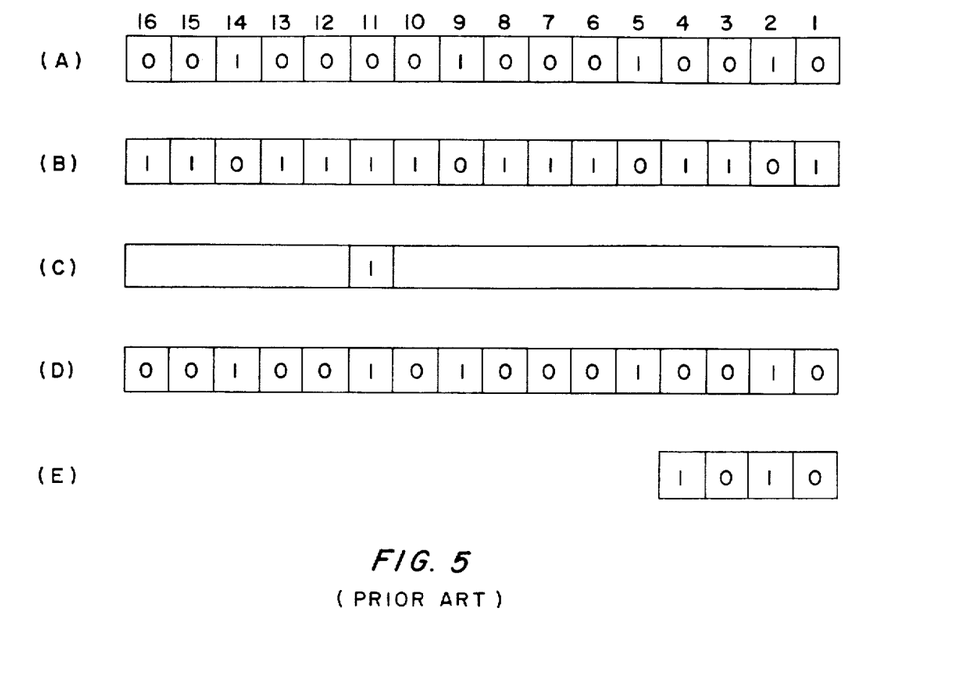
FIG. 5 is an explanatory diagram showing the bit construction of the information in the prior art processor.

This prior art procedure is explained with further reference being made to the data transition diagram shown in FIG. 5. Here is illustrated a data changing procedure in which the 11th bit data (data in the block 1K) of the 16-bit data is changed for inversion. The controller 6 (FIG. 1) generates the bit address data "1010" (which designates 11th bit data) and sets it at the bit address register 3. FIG. 5 (A) denotes the content of the 16-bit data to be read out from the memory 1 (FIG. 1). All of the 16-bit data are simultaneously inverted at the changing unit by the INVERT command signal $C_2$. (FIG. 5) (B) denotes the content of the inverted data, while (FIG. 5) (E) denotes the bit address actually data set in the bit address register 3 (FIG. 1). The multiplexer 5 uses wire $MW_{10}$ to select only the block 1 in which the 11th bit data is stored and gives the WRITE designating signal only to the block 1K. Accordingly, the 11th bit data "1" shown by (FIG. 5) (C) alone is written in the memory 1. The data shown by FIG. 5 (D) is stored in the memory where writing has been completed. Then, the 11th bit data alone is changed, as is clear when (FIG. 5) (A) and (D) are compared.

However, such a data changing procedure has many disadvantages which will be discussed hereinbelow. The first of such disadvantages is that a circuit (multiplexer 5) is necessary for generating the independent sixteen WRITE signals ($MW_0$–$MW_{15}$) equal to the number of data bits combined to form the bit address signal (output of 3) with the WRITE signal $C_3$. The second such disadvantage is that a connection wiring is required for the MW signal wire and the memory device. The manufacture becomes particularly difficult since the wiring structure is most complicated because all WRITE signal wires $MW_0$–$MW_{15}$ are independently connected to each block of the memory.

The third disadvantage or defect of the procedure of FIG. 5 is that the addressing for every bit becomes fixed by the wiring, and the bit by bit data changing is possible. Therefore, consider a changing which does not necessarily require changing by one bit; for instance consider resetting the all bit data of the memory or a part of the bit data from out of the read out bit data. It takes a long time to change the whole required bit data since only a change by one bit is possible per 1 memory cycle. In other words, the changing speed becomes excessively slow.

The fourth disadvantage or defect of the procedure of FIG. 5 is that it is impossible to extend the memory capacity. For instance, it was not applicable to a CRT which has a wider screen (a screen with more number of dots). As an example of a conventional type processor, we mention one which had one IC chip, but it is clear that the above defects appear also in the large capacity memory system including a plurality of printed circuit boards, each one of which has a plurality of IC chips. In this example, the above mentioned first defect naturally appears. The second to the fourth defects also appear when the memory blocks are replaced by boards. Thus, the conventional type device had extremely extensive defects or disadvantages in the system construction and irrespective of the memory capacity.

DESCRIPTION OF THE PREFERRED EMBODIMENT

Figure 2:
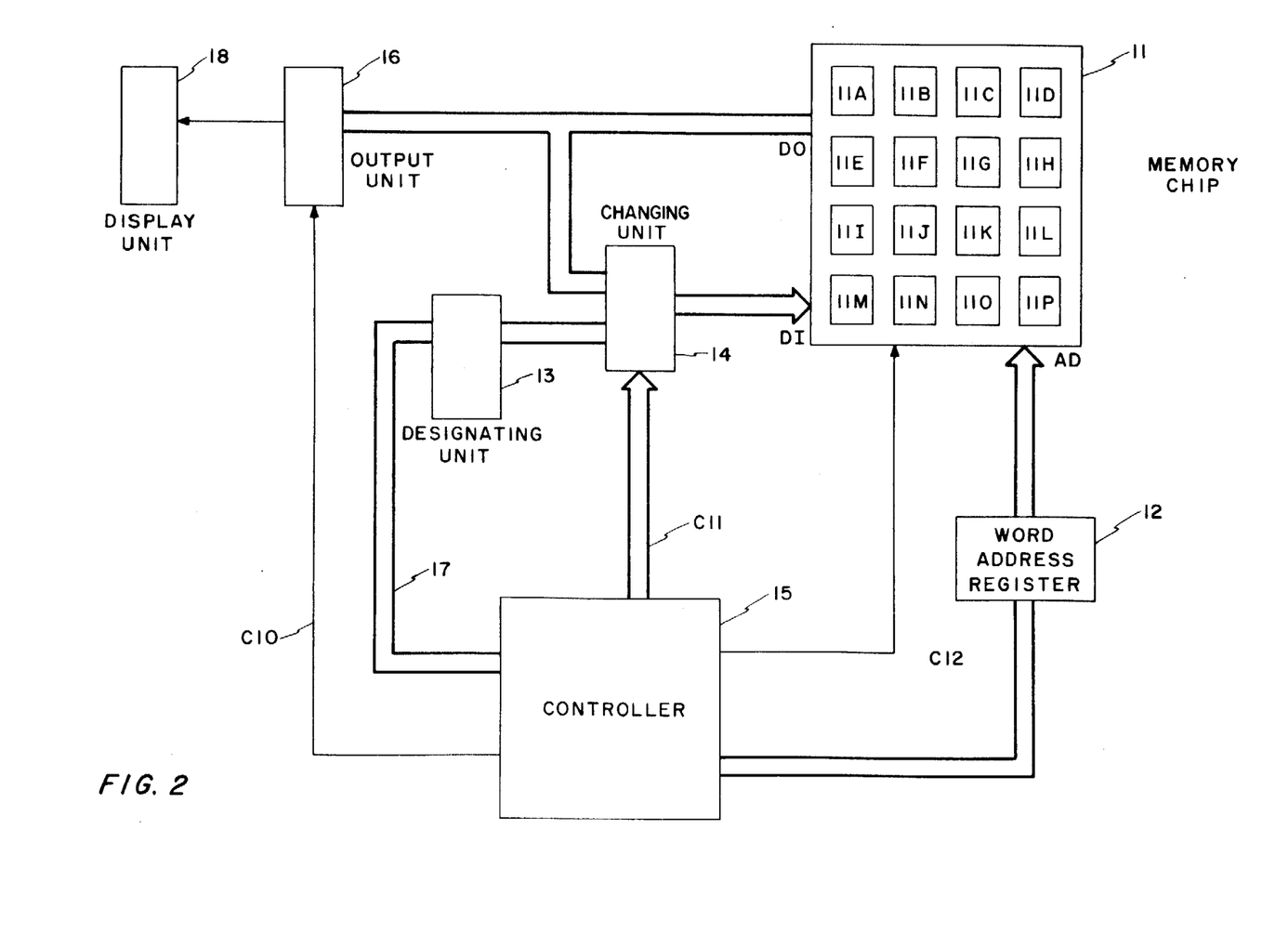
FIG. 2 is a block diagram showing major portions of one embodiment of the information processor of this invention having an improved information changing function.

FIG. 2 is a block diagram showing one embodiment of the present invention. This figure illustrates an example where 1-chip memory 11 is used.

The memory chip 11 is a 16-k-bit capacity dynamic type RAM (Random Access Memory) and includes sixteen memory blocks of 1-k-bit capacity (11A–11P). Data is transmitted bit by bit from each block simultaneously and by the total of 16 bits. The output data is read out to the data bus via the sixteen data output terminals DO, while the input data is supplied to the sixteen data input terminals DI. The address data is generated by the controller 15 and set by 10-bit unit in the word address register 12. Thus, set address data are transferred commonly to each of the memory blocks (11A to 11P) via the ten address input terminals AD. The 16-bit output data from the memroy 11 are transferred bit by bit in series to the display unit 18 via the output unit 16, in response to the control signal (timing signal) C10 generated by the controller 15.

On the other hand, the read out 16-bit data from the memory 11 is changed uniquely by the changing unit 14. The changing unit 14 receives the 16-bit output data from the memory 11 and transferres the 16-bit data including the changed data to the memory 11. The reference number 13 denotes a designating unit which designates the bit to be changed by the changing unit 14. The designating information is transferred from the controller 15 to the designating unit 13 via the bus 17. The controller 15 further generates the data changing command signal $C_{11}$ by carrying out the change instruction. When the data changing is completed, the 16-bit data is transferred from the changing unit to the memory 11. The WRITE signal $C_{12}$ controls the storage of the 16-bit data at the memory location in the memory 11. The address for designating the memory location in which the 16-bit data is stored is the same address used to read out the 16-bit output data for making the change.

The key point in this embodiment is the procedure that given the bit information to be changed and that changes only the required bit. Namely, the changing unit 14 has a first function for changing only the desired bit and a second function for inhibiting change for the undesired bit. Accordingly, the 16-bit output data from the changing unit 14 is completed to be ready for use as pattern data. Therefore, the 16-bit output data from the correcting unit 14 can be stored simultaneously in the memory 11. That is, the 16-bit output data, in which only the described bits are changed, are written in the memory 11 by means of only one WRITE control signal $C_{12}$ in FIG. 2. However, in the prior art shown in FIG. 1, only one changed bit is written in the memory 1 by means of only one WRITE control signal corresponding to the changed bit. Consequently, the sixteen WRITE signals ($MW_0$ ... $MW_{15}$) are necessary in the prior art shown in FIG. 1.

The bit data for which no changing is needed at the changed unit, 14 may be passed through the changing unit as it is. The circuit structure of the simplest type of the changing unit 14 to carry out this operation is so constructed that the only output bit corresponding to the "1" level information of the designating unit 13 is changed. For example if, an inversion instruction is carried out, two paths are provided for the each read out bit from the memory 11. An inverter is provided on one of these two paths. On these two paths are provided transfer gates respectively. The logical product manipulation is carried out for each of the 16-bit information of the designating unit (for instance an address register or an address decoder) and for the INVERT command signal "1" product manipulation is controlled in such a way that the gate with the inverter is opened when the result of the logical product is "1", and the gate with no inverter is opened when the result of the logical product is "0". This causes the bit designated by the designating unit 13 as "1" alone to become inverted. Then the WRITE signal $C_{12}$ is generated by the controller 15, to immediately transfer the changed portion of the 16-bit data to the memory 11, along with the portion has not been corrected.

Figure 6:
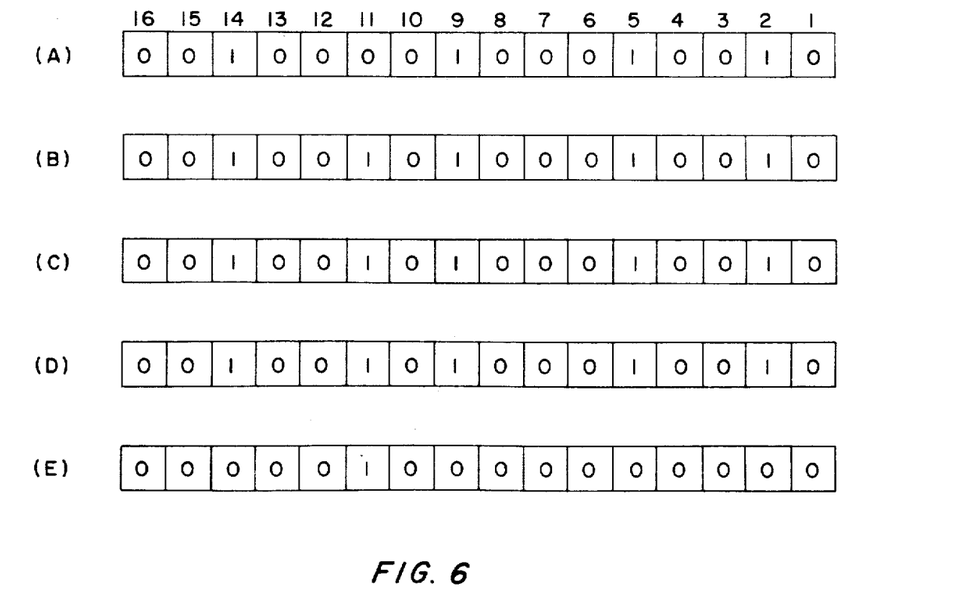
FIGS. 6 to 10 are explanatory diagrams respectively showing the bit construction of the information in the processor according to the present invention.

FIG. 6 shows an embodiment of the present invention showing the transition of the data change. The conditions are the same as those of the prior art shown in FIG. 5. The bit to be changed is assumed to be 11th bit from the bottom. Therefore, an address is made up by setting all the bits at "0" except for the 11th bit which is set at "1" as shown in FIG. 6 (E). This address is generated by the designating unit 14 (FIG. 2). Consequently, of all the read out data FIG. 6 (A), the content of the 11th bit alone is inverted by the changing unit 14, and stored in the memory 11 as the changed data (B). The data FIG. 6 to be transmitted to the memory 11 is the 16-bit data as shown in FIG. 6 (C), and these sixteen bits are stored in parallel in each of the memory locations simultaneously. The data which have been stored is denoted by FIG. 6 (D).

Figures 3, 4, 12:
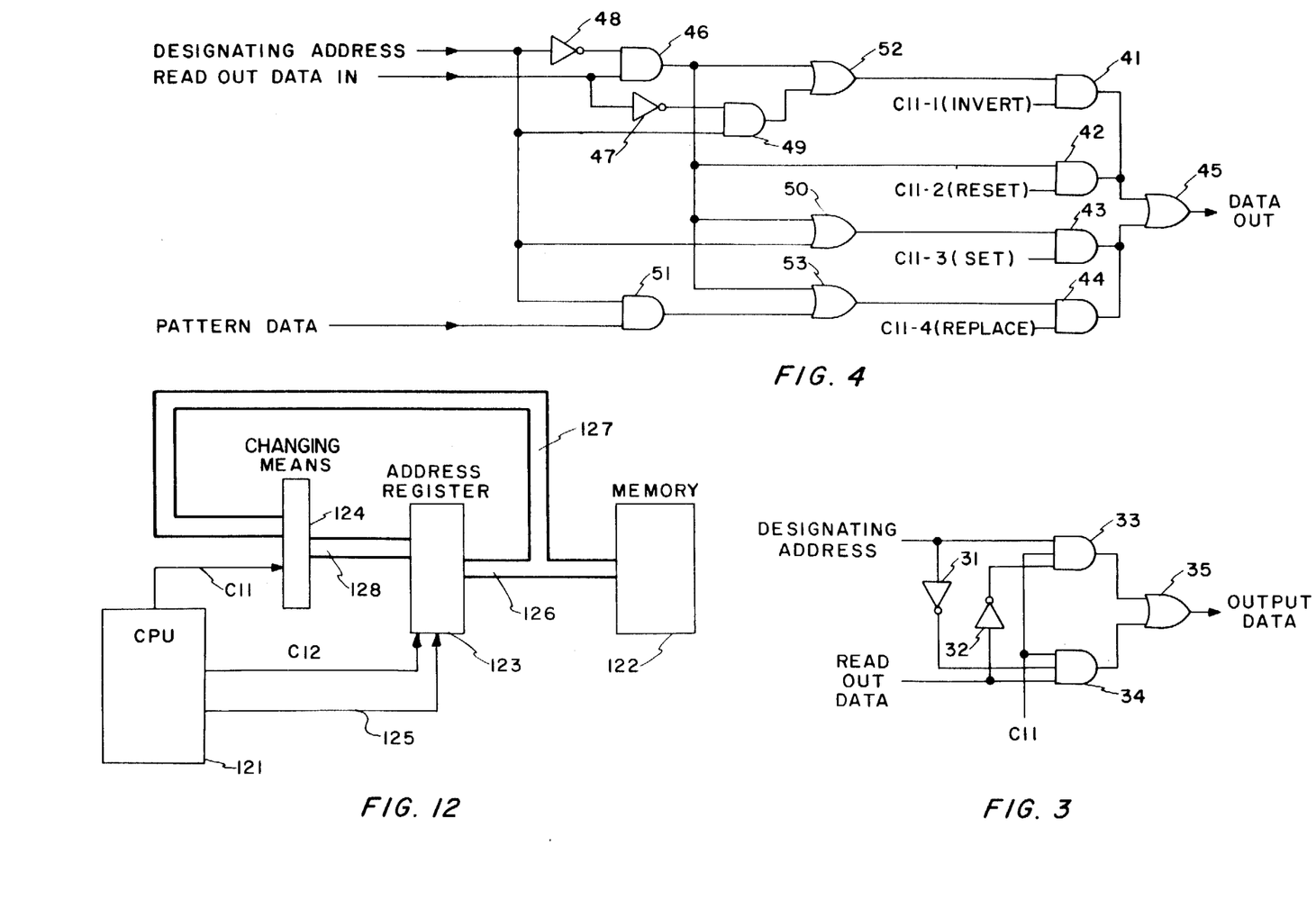
FIG. 3 is a block diagram showing the changing means illustrated in FIG. 2.
FIG. 4 is a block diagram showing another preferred embodiment of the changing means illustrated in FIG. 2.
FIGS. 11 and 12 are the block diagrams of another embodiment of the information processor according to the present invention.

FIG. 3 is an embodiment of a circuit construction per 1 bit of the changing unit which carries out the INVERT instruction. The changing address for designating the data bit to be changed and the data to be changed are inverted by the inverters 31, 32 so that each of them will have the two states ("1" and "0"). As they are controlled by the change command signal $C_{11}$, either one of them is selected to be transferred to the memory 11 via AND gates 33, 34 and OR gate 35. In this case, the bit data is inverted only when the changed address is "1". When it is "0", they are not inverted. Then, the sixteen bits data with the changed data and the non-changed data are transferred to the memory 11 in parallel.

In the information processer, according to this embodiment, the data changes by the bits may be performed easily with a simple changing circuit. Now, if the designating unit 13 is constructed of a shift register to perform bit rotation to the left or the right, all sixteen read out data bits could be changed by rotation of designating information. On the other hand, if the controller 15 generates sixteen bit designating information, optional bit (between 1 to 16) of the sixteen read out data could be changed. Further, if the designating unit 13 is constructed of a decoder receiving 4-bit information from the controller 15, any one bit from 1st to 16th could be changed freely.

Figure 7:
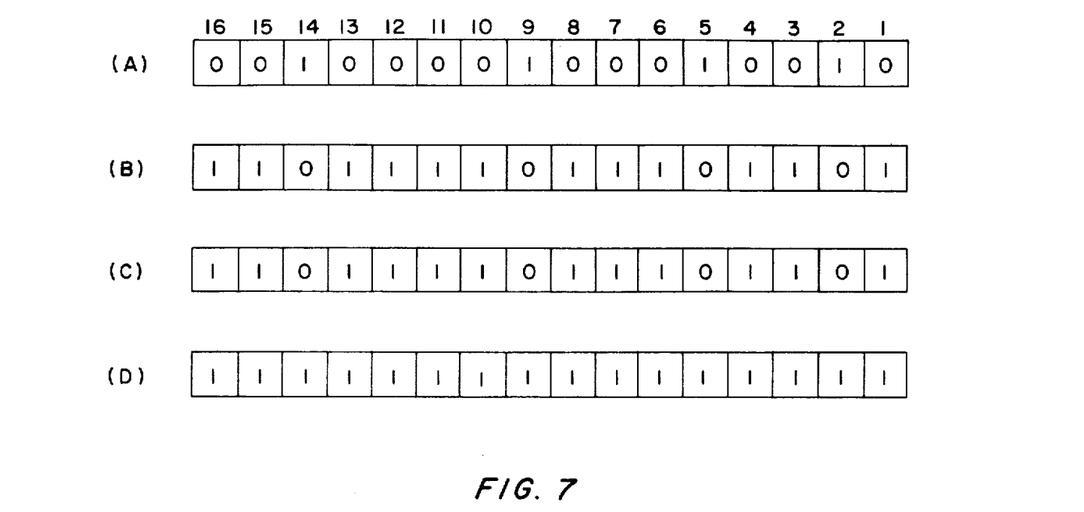

Furthermore, the designating unit 13 may be constructed of a programmable counter or an ordinary register of which preset information may be made arbitrarily changeable by the controller. In this case, if the preset information at the counter or the register were all at "1" or partially at "1", all the read out data or a plurality of partial bits may be changed simultaneously. The inversion changing of all the bits of the read out data is shown in FIG. 7. In this case, the designating address for the data bit to be changed is generated by the designating unit 13 as shown in FIG. 6 (D). As a result of this, the data inverted by the inverter 32, of the read out data to the change gate shown in FIG. 3, is transferred to the memory 11 via AND gate 33. That is to say, the changed data becomes the data shown in FIG. 6 (B). All the sixteen bits of this read out data are stored simultaneously in each of the corresponding blocks 11A and 11P in the memory 11 (FIG. 2).

Figure 8:
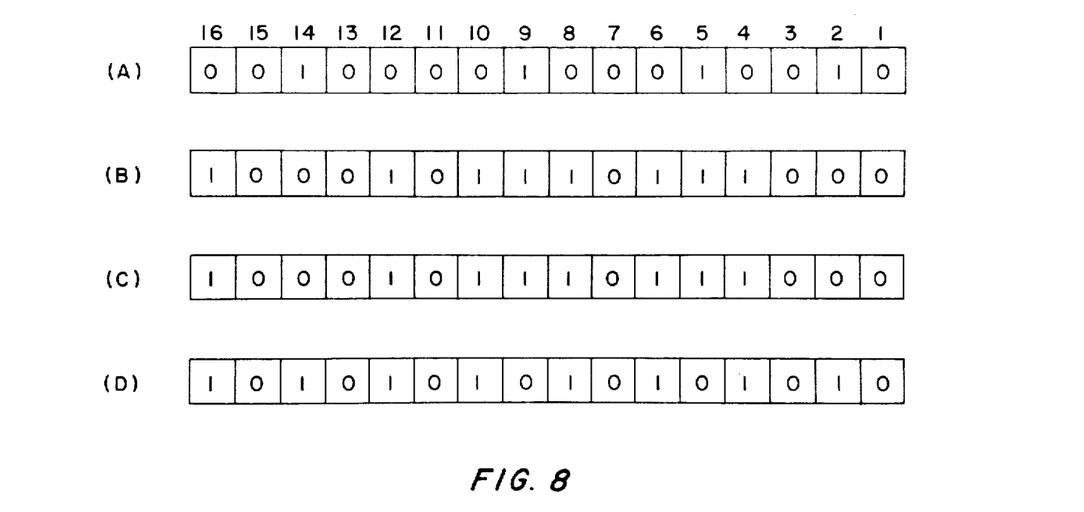

If the designating address generated by the designating unit 13 was to designate the even numbered bit, the read out data is changed as shown in FIGS. 8. FIG. 8, (A), (B), (C) and (D) denotes respectively the data read out from the memory 11 by the address data, the data changed by the changing member 14, the data stored in the memory location designated by the same address data, and the designating address information.

The present invention further enables a change of the selected portion of the stored data. For example, the upper area (9th to 16th bits), the lower area (1st to 8th bits), etc., are corrected thereby offering a selective change of the read out data with a high speed. According to the present invention, this information processor is best suited for the pattern display unit or the graphic display unit in which a high-speed data change is required.

As for the design of the information processor according to the present invention, it is possible to commonly use only one WRITE signal $C_{12}$ for all the memory cells in the memory 11. In addition, the multiplexer 5 for bit-by-bit selection becomes unnecessary. Thus, the design of the processor becomes quite simple, and an increase of memory chips is also quite easy without limitation for the number.

The circuit for the changing unit 14 may be constructed as shown in FIG. 4. This FIG. 4 shows the changing circuit for 1 bit of data. This changing circuit has the changing functions of INVERT, RESET, SET, and REPLACE. In this case, the controller 15 (FIG. 2) decodes four change instructions, and generates respectively the INVERT signal $C_{11-2}$, RESET signal $C_{11-1}$, SET signal $C_{11-3}$, and REPLACE signal $C_{11-4}$. These signals are supplied respectively to one of AND gates 41—44.

The output data (Data-in) fed to the change circuit is transferred to one of the input terminals of AND gate 46 and to the input terminal of the inverter 47. The designating address from the designating unit 13 (FIG. 2) is supplied to the other input terminal of AND gate 46 via the inverter 48. Furthermore, the designating address is also supplied to one of the input terminals of AND gates 49, 51 and OR gate 50. To the other one of the input terminals of AND gate 49 is supplied the output of the inverter 47; while to the other one of the input terminals of OR gate 50 is supplied the output of AND gate 46. At the other input terminal of AND gate 51 is supplied the pattern data which is to be replaced. The outputs from AND gates 46, 49 are then led to AND gate 41, via OR gate 52, and then sent on to a subsequent stage. The output of AND gate 46 is then led to AND gate 42. The output of OR gate 50 is led to AND gate 43 for performing a setting function. The outputs from AND gates 46 and 51 are fed via OR gate 53 to AND gate 44 for ordering a REPLACE correction. The output from each of the AND gates 41—44 is transferred via OR gate 45 to the memory 11, as a changed data (data-out).

Figure 9:
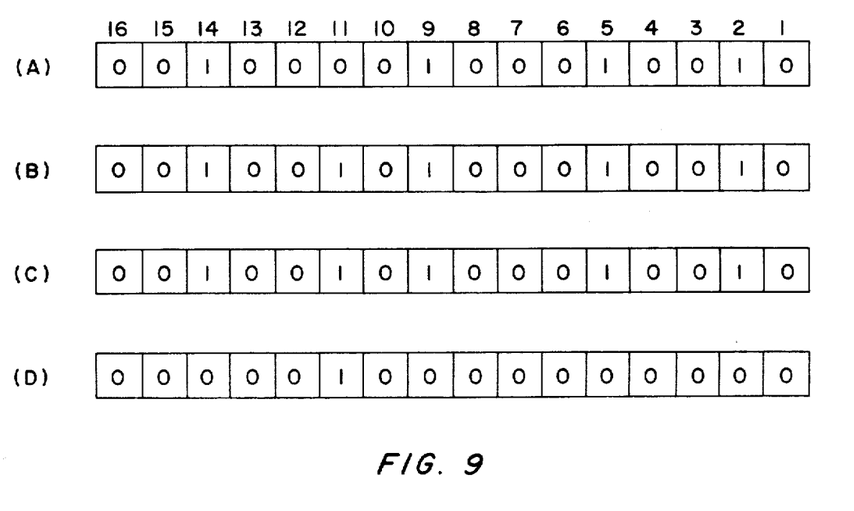
Figure 10:
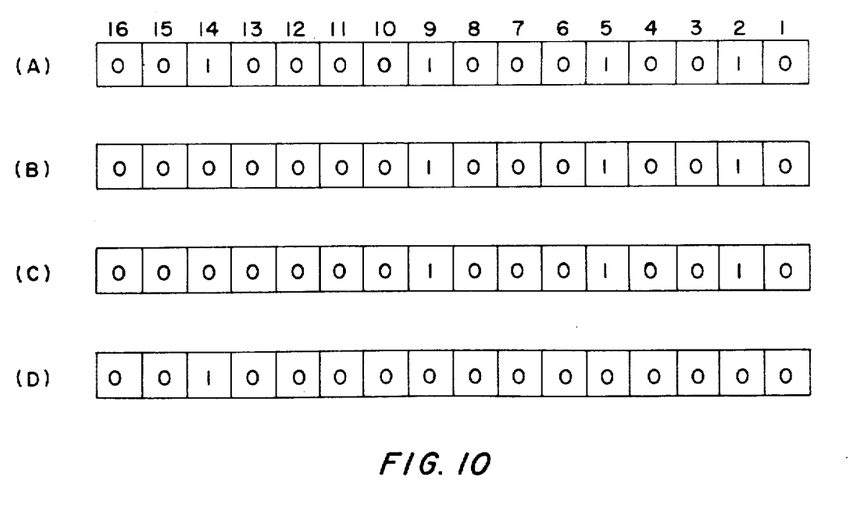

If this changing circuit 14 (FIG. 4) is used, the data change as shown in FIGS. 9 and 10 are carried out in response to SET and RESET instructions. That is to say, the data in the memory 11 shown in FIG. 9(A) is designated so as to have its 11th bit change responsive to the designating address denoted by (D). If a SET instruction is carried out in this state (i.e. FIG. 9A), the 11th bit unconditionally becomes "1". The data (B), after change, is stored in the memory 11 as it is (as shown in (C)).

When the 14th bit of the data shown in FIG. 10(A) is designated by (D), and the RESET instruction is carried out, the content of the 14th bit unconditionally becomes "0". Accordingly, the data (B), after change is stored in the memory 11 as (C). If a REPLACE instruction has been carried out, the pattern data to be replaced is transferred to the memory 11 via AND gate 51.

If the changing circuit is constructed as above mentioned, the changing such as data inversion, reset, set, replace, etc. are easily carried out in respect of all the bits or arbitrary number of bits of the read out data. Furthermore, since the number of the data stored in the memory 11 is equal to the number of the output data of the changing circuit a, 16-bit data may be stored all at once in the memory 11 in response to only one WRITE signal $C_{12}$. Thus, complex circuits (for instance a, multiplexer for bit selection, etc.) are undesired, and increasing the memory chip or capacity becomes quite easy.

Figure 11:
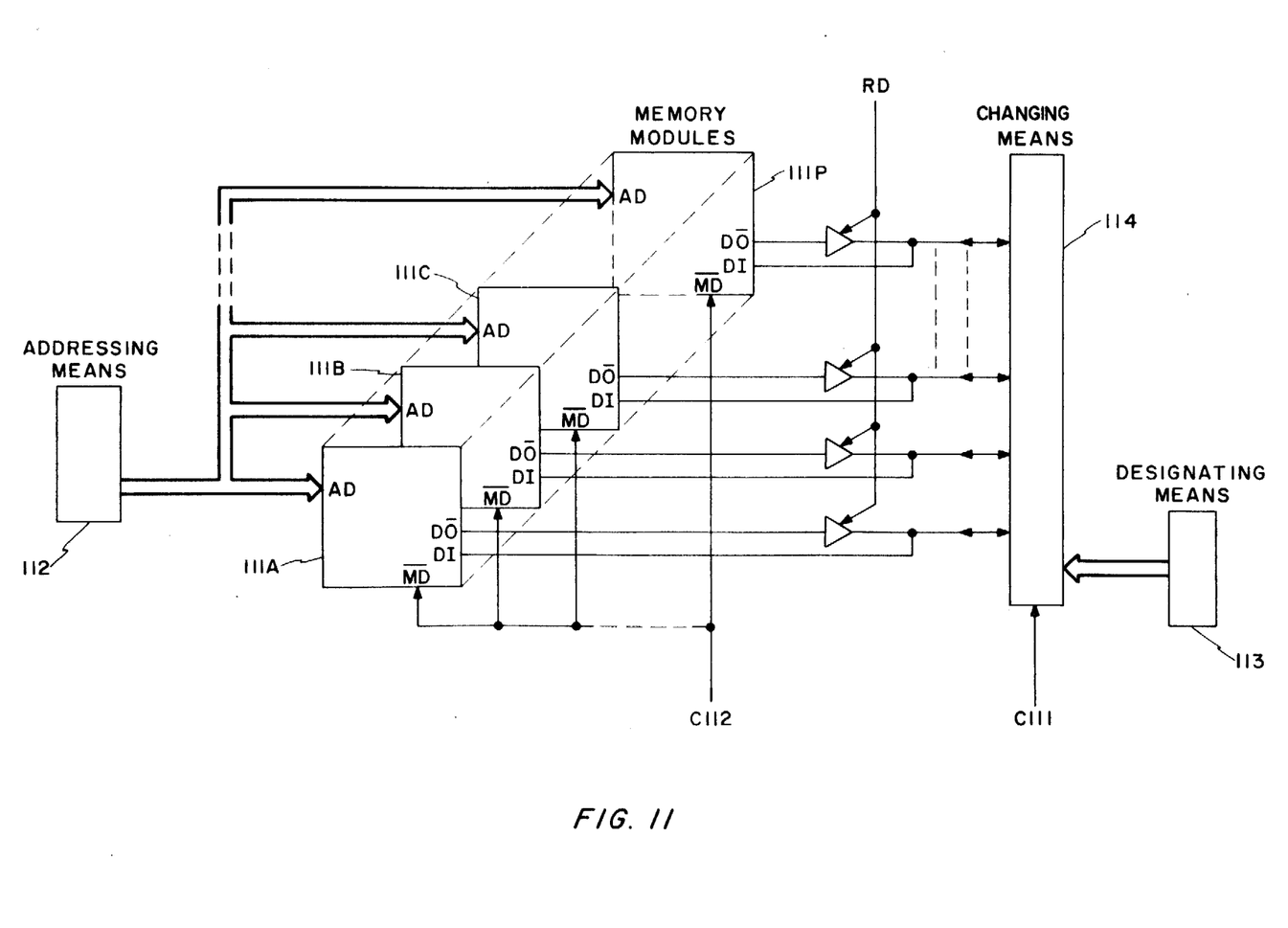

The present invention may be embodied not as 1-chip memory, but as a plurality of memory chips having a plurality of printed substrates (memory boards) packaged thereon. In this case, a system is formed as shown in FIG. 11. In the figure, the sixteen memory modules 111A—111P are the sixteen printed memory boards on which a plurality of memory chips are packaged. From each of the memory modules is read out the one bit data to the changing means 114, via a buffer, in response to the control of the READ signal RD. Of the 16-bit read out data, the bit designated by the designating means 113 is corrected in response to the change command signal $C_{111}$.

When the change is completed, each of the 16-bit data is simultaneously stored in the corresponding memory module The storing is controlled by only one WRITE signal $C_{112}$. The number 112 denotes the addressing means required to access memory location in which the data to be changed is stored. It is quite clear that the effects of the present invention are achievable when the memory system is constructed as mentioned above.

If the designating address is directly transferred from the controller as shown in FIG. 2 to the changing means 114, the designating address means 113 (for instance, a register) may be omitted.

The present invention is further applicable to changing the character pattern information in addition to changing the graphic pattern information for CRT display unit. Usually, the ordinary character patterns (such as A, B, C, etc.) are set together in the character generator, in advance. With such a character generator, the address indicating the stored character pattern information is designated and the character pattern is read out.

In this case, there are at least two applications conceivable for the present invention. One is an application as a pattern changing device for correcting the character pattern information which has been read out. The other is an application as an address changing device which changes the address information designating the character pattern to be read out, and which changes the character pattern to be displayed. It may also be applied to the general computer system in addition to the information changing device for CRT display. For instance, it may be applied to the case where the command or instruction codes set with the read only memory (ROM) (commands for addition, interruption, transfer or jump) are read out. The read out command code is then transferred to the device being controlled. The read out command code, further, may be changed by the present invention in order to create next command code which is to be carried out.

In this case, the command code to be changed is set in a memory means such as RAM or register. Thus a set command code is read out, and the necessary change is carried out, changed to another command code, and the new command code (after the change) is then stored in the memory means. It is naturally possible to change the command code by directly using the changing means of the present invention and setting the same in the memory means without first setting the change command in the memory means. Further, the changed command may be used as it is without storing in the memory means. In addition, the present invention is applicable to changing an address data which designates the memory locations. The operation is to be carried out as above mentioned, and the information to be changed is merely replaced by the address data.

The present invention is most effective when applied to the Next Address System recently developed in the field of software. A Next Address System is a system which adds the address data indicating the address where the information next read is set with the command code or the data code. In this case, the processing time is radically shortened because there is no need for making up an address. However, this system was restricted in its processing function because the address could not be altered. Accordingly, when the present invention is applied, these defects can easily be overcome because the address can now be altered. If the Next Address were to be made up at the changing means, the need for setting the Next Address in the memory in advance may also be eliminated, thereby economizing the memory used.

It is also easily conceivable to apply the present invention as an address generating means. For instance, if the address data was constructed as an 8-bit address as shown in FIG. 12, it would be sufficient to have one 8-bit register 123 ready, where the new address data may be consecutively generated by successively changing the address data stored therein at a changing member 124. In this case, an 8-bit address data is supplied from the address register 123 via an address bus 126 to a memory 122 in response to a control of READ signal 125 generated by the CPU 121. The address data thus read is then transferred to changing means 124 through a bus 127, subjected to a change as above described by the change command signal $C'_{11}$ from CPU 121. Then the address data of the memory 122 to be designated next is set in the address register 123, through the bus 128. The reference character $C'_{12}$ denotes a WRITE signal for setting the corrected address data to the register 123.

As discussed heretofore, the present invention is advantageous in that various information corrections and alterations can be performed at high speeds and with ease, in addition to those already discussed above, and its scope of applicability is quite extensive.

What is claimed is:

1. An information processor comprising memory means storing information comprising a plurality of words, each of said stored words having a plurality of bits, means for generating address data to designate one of said stored words, means coupled to said memory means and to said generating means for applying said address data to said memory means, means coupled to said memory means and responsive to said address data for taking a plurality of bits, in parallel, out of said memory means, the plurality of bits taken out of said memory means being one word designated by each of said address data, designating means for designating at least one of the taken-out plurality of bits, a changing means for each of the plurality of bits, said changing means comprising an inverter, changing gate and transferring gate, the inverter being coupled to said taking out means for inverting and changing the associated bit from said taking out means, the changing gate being coupled to said inverter and to the designating means for transferring the associated changed bit only if the bit is one of the at least one designated bits and the transferring gate being coupled to said taking out means and to the designating means for transferring the associated bit without change if the bit is not one of the at least one designated bits, and writing means coupled to said changing means and to said memory means for simultaneously writing said at least one changed bit and unchanged bits into the same address of said memory means as the address from which said plurality of bits have been taken out, the word length of said at least on changed bit and unchanged bits being equal to that of the taken out plurality of bits of said one word.

2. An information processor claimed in claim 1, wherein said changing gate operates to make the logic signal of said at least one designated bit the logic "0".

3. The information processor claimed in claim 2, wherein said changing means has a designation signal input section, a taken out information input section, a changing section and a passing section, said first designation signal and said second designation signal being applied to said designation signal input section, and said taken out information being applied to said taken out information input section.

4. The information processor claimed in claim 3, wherein said changing section is activated in response to said first designation signal, and said passing section is activated in response to said second designation signal.

5. An information processor claimed in claim 1, wherein each of said changing gates is made conductive in response to an application thereto of an output signal from said designating means, to pass the changed bit to said writing means, or each of said transferring gates is made conductive in response to the output signal of said designating means to pass the unchanged bit from said taking-out means.

6. The information processor claimed in claim 1, wherein each of the bits has a logical state of "1" or "0".

7. The information processor claimed in claim 1, wherein said transferring gate is disenabled when said designating means identifies all of said taken out bits as bits which are to be changed.

8. An information processor comprising:
a random access memory means having a plurality of addressed memory locations for storing information therein;
means for simultaneously reading out a plurality of the stored information from the addressed memory locations of said random access memory means;
changing means having two inverting circuits, a setting circuit, a resetting circuit, and a replacing circuit, said replacing circuit in said changing means replacing said read out information by new information;
selecting means coupled to said changing means for selecting one of said two inverting circuits in response to a command signal;
designating means coupled to said changing means for designating at least one of said plurality of read out information;
said changing means changing said designated information by means of the circuit selected by said selecting means; and
means for simultaneously restoring said changed information and any non-changed read out information to said random access memory means.

* * * * *